J. A. TAPLIN.
Thrashing Machine.
No. 10,191.  Patented Nov. 1, 1853.
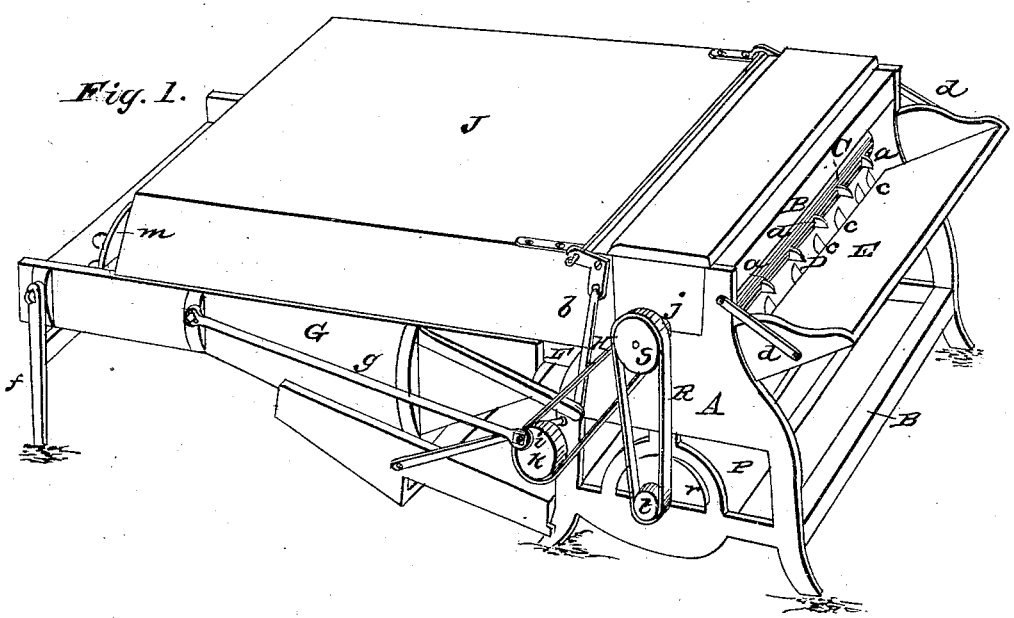
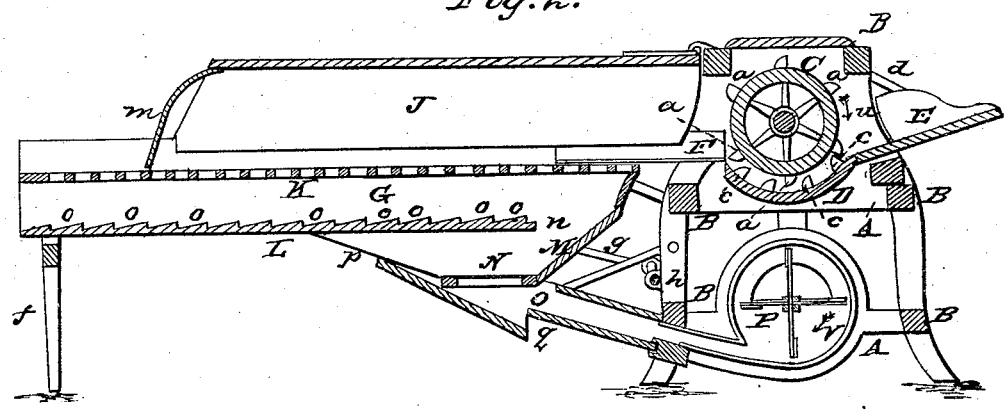

UNITED STATES PATENT OFFICE.

JNO. A. TAPLIN, OF FISHKILL, NEW YORK.

STRAW AND GRAIN SEPARATOR.

Specification of Letters Patent No. 10,191, dated November 1, 1853.

*To all whom it may concern:*

Be it known that I, JOHN A. TAPLIN, of Fishkill, in the county of Dutchess and State of New York, have invented certain new and useful Improvements in Machines for Threshing and Cleaning Grain; and I do hereby declare that the following is a full, clear, and exact description of my said invention, reference being had to the accompanying drawing, which forms part of this specification, and in which—

Figure 1 represents a view in perspective of my improved grain thresher and cleaner, and Fig. 2 is a vertical longitudinal section of the same.

My machine is constructed to thresh the grain, to separate it from the straw, and to clean or winnow the separated grain.

It comprises a threshing cylinder and concave, a reciprocating straw-carrier and grain-separator, and a fan with suitable appurtenances for winnowing and sifting the grain.

The threshing apparatus is supported by a strong frame which is composed in this instance of metal end plates A, A, connected by wooden rails B, B. It consists of a cylinder C, whose barrel is studded with teeth $a$ and whose gudgeons are supported in suitable boxes secured to the bars of the frame, and of a concave D which is situated beneath the cylinder and whose hollow face is also studded with teeth $c$. In front of this threshing apparatus is the table or apron E which extends the whole breadth of the frame and is connected therewith by strips $d$. Behind the concave and upon a level with its upper edge is a spout F, by which the threshed grain is delivered to the straw-conveyer and grain-separator. This consists of a long trough G equal in breadth with the frame of the threshing apparatus and suspended therefrom at its nearer extremity by link-bars $b$ which permit it to move longitudinally toward and from the frame. The opposite or farther extremity of the trough is pivoted to the upper extremities of a pair of legs $f$ which support its weight and act as radius bars to permit it to move longitudinally. A reciprocating movement is imparted to this trough by means of a pair of connecting rods $g$ which are pivoted to crank pins $i$, that project from a horizontal shaft $h$, to which a rotary motion is imparted by the threshing cylinder through the intervention of a belt H which encircles pulleys $j$, $k$, secured respectively to one of the gudgeons of the cylinder and to the crank-shaft $h$. The upper part of the trough is closed by a removable cover J fitted at its hinder extremity with a flap $m$ which closes its hinder end. The interior of the trough is divided into two parts by a screen K, which in this instance is a perforated plate whose perforations are sufficiently large to permit the free passage of grain but are small enough to retain the straw. The bottom of the trough is closed, with the exception of a narrow space $n$ at the extremity nearer the threshing apparatus, by a fluted bottom board L, the flutes of which have the section shown in Fig. 2, their inclined sides $o$ being toward the threshing apparatus.

An inclined board or chute M is secured to the trough beneath the open space $n$ to receive the unchaffed grain as it passes through this space and to deliver it upon a grating N. The latter is secured to a frame which is extended across the trough beneath the fluted bottom board and is secured to the side boards of the trough which at this end extend below the fluted bottom board to form, with the chute M, and grating N, a shoe in which the foul grain is exposed to the blast of a fan. The shoe thus formed is open at its hinder end $p$. Immediately beneath it is the wind chamber O through which the blast of the fan is passed. This wind chamber has an opening $q$ in its bottom to deliver the cleaned grain. Its front extremity communicates directly with the fan case P which is secured to the main frame below the threshing apparatus. The journals of the fan shaft are supported by suitable boxes secured to the frame, portions of which are of the proper shape to form the heads of the fan case. The fan is driven from the threshing cylinder by means of a belt R which encircles pulleys $s$, $t$, secured to their respective shafts. The heads of the fan have openings in them to admit the air and suitable shutters $r$ are fitted to the openings to regulate the amount of air drawn in.

The machine thus constructed is put in operation by applying a driving belt to a pulley secured to the shaft of the threshing cylinder. As the latter revolves in the direction indicated by the arrow $u$ in the drawing, the crank shaft $h$ is turned by the action of the belt H to impart a reciprocating movement to the grain separator, while at the same time the fan wings are caused to revolve by the action of the belt R in the direction of the arrow $v$. The grain is fed in upon the apron E and is drawn into the machine and threshed by the action of the teeth of the threshing cylinder acting in connection with those of the concave. As it leaves the threshing apparatus it passes along the spout F to the grain separator. In its movement over the reciprocating screen K the grain drops through and falls upon the fluted bottom board while the straw passing onward is delivered at the hinder extremity of the machine. The grain falling upon the fluted bottom plate is drawn with it by the vertical sides of the flutes toward the threshing apparatus, but as the bottom plate moves backward the grain tends to remain in its position and the inclined faces of the flutes passing beneath it move it back a less distance than the vertical sides of the flutes draw it forward, so that it falls into the next succeeding flutes. The grain and other matters are thus moved by successive impulses toward the front extremity of the separator, where they fall through the space $n$ and are delivered by the chute M upon the riddle N. They here meet the blast of the fan, which carries off the lighter impurities through the open hinder end of the shoe, while the grain falling through the riddle is thoroughly cleansed by the blast passing through the wind chest and is delivered in a clean state at the bottom of the machine through the opening $q$.

In order to facilitate the discharge of the straw, the screen may be placed level, or with a descent backward, by inclining the legs $(f)$, on which its hinder extremity rocks and is supported, and the grain will still in this position pass through the apertures in the screen case as well as if the inclination was the other way, and in this position the fluted bottom will readily return the grain back to the winnower, which could not be done by a plain bottom. The combination of the screen and fluted bottom thus performs a new and important function not found in other machines.

What I claim as my invention and desire to secure by Letters Patent is—

The vibrating straw-carrier and grain separator constructed as herein set forth with a screen K, and fluted bottom board L, for the purpose of separating the grain from the straw, returning the former to the winnowing apparatus, and conveying the straw to the hinder extremity of the machine.

In testimony whereof I have hereunto subscribed my name.

JOHN A. TAPLIN.

Witnesses:
 Wm. D. Washington,
 P. H. Watson.